(12) United States Patent
Elliott

(10) Patent No.: US 7,204,687 B2
(45) Date of Patent: *Apr. 17, 2007

(54) GATE COOLING STRUCTURE IN A MOLDING SYSTEM

(75) Inventor: Gordon Elliott, Toronto (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 15 days.

This patent is subject to a terminal disclaimer.

(21) Appl. No.: 11/302,100

(22) Filed: Dec. 13, 2005

(65) Prior Publication Data

US 2006/0099295 A1    May 11, 2006

Related U.S. Application Data

(63) Continuation of application No. 10/455,469, filed on Jun. 5, 2003, now Pat. No. 7,104,782.

(51) Int. Cl.
*B29C 45/72* (2006.01)

(52) U.S. Cl. ..................... 425/547; 425/548

(58) Field of Classification Search ............... 425/547, 425/548
See application file for complete search history.

(56) References Cited

U.S. PATENT DOCUMENTS 4,622,001 A * 11/1986 Bright et al. ............... 425/552

| | | |
|---|---|---|
| 5,015,170 A | 5/1991 | Gellert |
| 5,443,381 A | 8/1995 | Gellert |
| 6,017,209 A | 1/2000 | Gellert et al. |
| 6,220,850 B1 | 4/2001 | Catoen et al. |
| 6,569,370 B1 | 5/2003 | Amin et al. |

FOREIGN PATENT DOCUMENTS

| | | |
|---|---|---|
| DE | 100 24 625 A1 | 11/2001 |
| EP | 0933186 A1 | 8/1999 |
| WO | WO 00/27609 | 5/2002 |
| WO | WO 04/043675 A1 | 5/2004 |

OTHER PUBLICATIONS

International Search Report for PCT/CA2004/000654, Aug. 18, 2004, pp. 1-4.
Letter to the World Intellectual Property Organization from Otto Hofstetter AG, a Swiss Company, dated Apr. 7, 2005, 7 pages including enclosures listed in the letter.

* cited by examiner

*Primary Examiner*—Tim Heitbrink

(57) ABSTRACT

A gate insert (10, 110) for a stack assembly in an injection molding machine having a gate (16, 116) through which a melt of thermoplastics material enters a mold cavity (14, 114). The gate insert has a cooling channel (18, 118) surrounding, and substantially uniformly spaced from, the gate (16, 116). The cooling channel has an inner surface with a profile substantially parallel to the gate. The cooling channel is further defined by a two-piece gate insert having interconnecting surfaces (111*a*, 111*b*).

15 Claims, 2 Drawing Sheets

GATE COOLING STRUCTURE IN A MOLDING SYSTEM

CROSS-REFERENCE TO RELATED RELATED PRIOR APPLICATION

This application is a continuation of prior application Ser. No. 10/455,469, filed on Jun. 5, 2003 now U.S. Pat. No. 7,104,782 and claims the benefit therefrom.

BACKGROUND OF INVENTION

1. Technical Field of the Invention

The invention relates in general to a molding stack and is particularly, but not exclusively, applicable to a stack component used within a stack of an injection mold. In particular, it relates to a gate insert having a cooling channel surrounding the gate to improve heat transfer for cooling the mold.

2. Description of the Related Art

As is commonly known, a molding stack for injection molding a preform typically includes a core, a neck ring pair, a cavity, and a gate insert. The gate insert typically has a narrow cylindrical passage called a gate, through which a melt of thermoplastic material enters a cooled molding cavity. The time required to cool the melt of plastic contained in the gate, after the mold cavity has been filled and packed, often dictates the duration of the cooling phase of the molding cycle, and is a direct result of having started cooling last; and, due to the fact that the gate sits adjacent a heated hot runner nozzle (i.e. nozzle tip/insulator interface) and is therefore difficult to cool. This is particularly true of preform molds with extended gates. An extended gate produces a preform with an extended nub, the purpose of which is to encapsulate any imperfections in the nub. A portion of the nub may be trimmed in a post-mold process.

In the case of PET preforms, common manufacturing defects are:

Crystallinity: the resin recrystallizes due to the elevated temperature of the core resin not cooling quickly enough. The white appearance of the crystals impairs the clarity of the final product and provides an area of potential weakness in a resultant blown product, especially in the gate region.

Surface blemishes: the ejected preforms, initially having solidified surfaces, are reheated by the bulk/core material, which causes the surface to soften and be easily marked. The insulation properties of the plastic support, over time, the migration of heat to the surface of the preform to cause the surface reheating effect. Sometimes this surface reheating can be severe enough to cause touching parts to weld together.

Geometric inaccuracies: handling partly-cooled preforms or attempting to further cool them in devices that do not maintain their geometric shape while their surfaces are reheated can cause the preform's round diameter to become oval shaped or the smooth surface to become wrinkled or non-linear. Uniform cooling of the part is therefore important.

The above-noted problems can be alleviated somewhat by extending the cooling time of the injection molded preforms in their mold. However, this will cause the injection molding cycle to be lengthened, and is not desirable because cycle time increases and productivity is diminished.

One approach to overcome the aforementioned problems is to introduce a cooling structure to improve heat transfer and cooling of that part of the mold (i.e. the nub) in the gate. This approach has been addressed in several different ways, each of which uses a cooling channel surrounding the gate.

However, in general terms, the prior art cooling channel configurations are regarded as having less than optimal heat transfer between the melt in the gate and the coolant in the cooling channel, due to excessive separation distance therebetween, that in turn dictates a longer cooling/cycle time. The excessive separation distance is often a result of having to provide the gate insert with a load bearing structure necessary to accommodate the high compressive mold clamping force that acts therethrough. The two most commonly known gate insert configurations include a cooling channel configuration that is either a circumferential groove or a diamond-drilling pattern.

The circumferential groove-cooling channel is typically formed from the outside surface of the gate insert adjacent the gate. The size of the cooling channel is quite limited in that it is desirable, from a flow dynamics perspective, to match the cumulative cross-sectional area of the flow paths around the gate to that of the source/sink coolant supply channels, provided through a cavity plate. Further, the maximum depth and overall profile of the groove is generally dictated by the configuration of the resultant web, between the groove and the gate, that must be capable of withstanding the applied mold clamping force without permanent deformation. In practice, the required size of the web dictates a relatively large separation distance between the cooling channel and the gate and as such does not provide for optimal gate cooling efficiency.

Alternatively, the diamond drilling cooling channel provides a crude approximation of a toroidal channel surrounding the gate, and is a resultant of an array of intersecting coplanar drill lines. The resultant flow channel is typically six-sided, as is considered to be the practical design limit. Again, the size of the cooling channel is chosen, from a flow dynamics perspective, to match the cumulative cross-sectional area of the flow paths around the gate to that of the source/sink coolant supply channels. Further, the crude form of the toroidal cooling channel dictates that the separation distance between the cooling channel and the gate varies along the flow path, and hence the optimal heat transfer occurs only at a limited number of points, six in the typical case. More particularly, non-uniform cooling can adversely affect port quality.

A further alternative is illustrated in DE 10024625, which proposes a copper alloy insert ring containing "diamond drilled" cooling channels. The channels result in non-linear heat transfer across the gate, which is undesirable. Furthermore, by choosing an insert ring an extra heat resistor is introduced due to the gap between stainless steel gate and copper alloy ring, thereby potentially reducing total heat transfer. The choice of copper may also critically impact the structural soundness of the gate when subjected to the high loads, in use.

The present invention and its preferred embodiments seek to overcome or at least mitigate the problems of the prior art.

SUMMARY OF THE INVENTION

One aspect of the invention provides a gate insert for a stack assembly of a mold, the gate insert having a gate through which, in use, melt material can enter a mold cavity. The gate insert has a cooling channel surrounding the gate and a coolant passageway connecting, in use, the cooling channel to a coolant supply. The cooling channel is shaped to follow the profile of at least part of the gate and spaced by a substantially uniform distance from the surface of the gate. The gate insert is formed from two halves: a nozzle half and a molding half, each half having a surface to be interconnected to the other half. The cooling channel and the coolant passageway are configured between the interconnecting surfaces of the nozzle half and molding portions.

The cooling channel may be shaped to follow the profile of an upper part of the mold cavity adjacent the gate. Preferably, the cooling channel is further shaped to follow the profile of a nozzle interface adjacent the gate.

In some embodiments, the cooling channel is annular in shape. The coolant passageway may be provided by an inflow passage and an outflow passage, each connected to the cooling channel. Each passage is preferably of equal diameter to match coolant flow through the cooling passage.

A second aspect of the invention provides a stack assembly including the gate insert.

A third aspect of the invention provides an injection mold including the gate insert.

BRIEF DESCRIPTION OF DRAWINGS

Exemplary embodiments of the present invention will now be described with reference to the accompanying drawings, in which.

DETAILED DESCRIPTION

As mentioned above, a mold stack in an injection molded machine includes a gate. The gate is preferably encapsulated in a gate insert. The gate insert is a component that has an aperture through it with three portions: a hot runner nozzle interface, a molding cavity and a gate. The gate is arranged between, and connects, the nozzle interface and the molding cavity. In this example the molding cavity is for forming the domed end portion of a preform.

Figure 1:
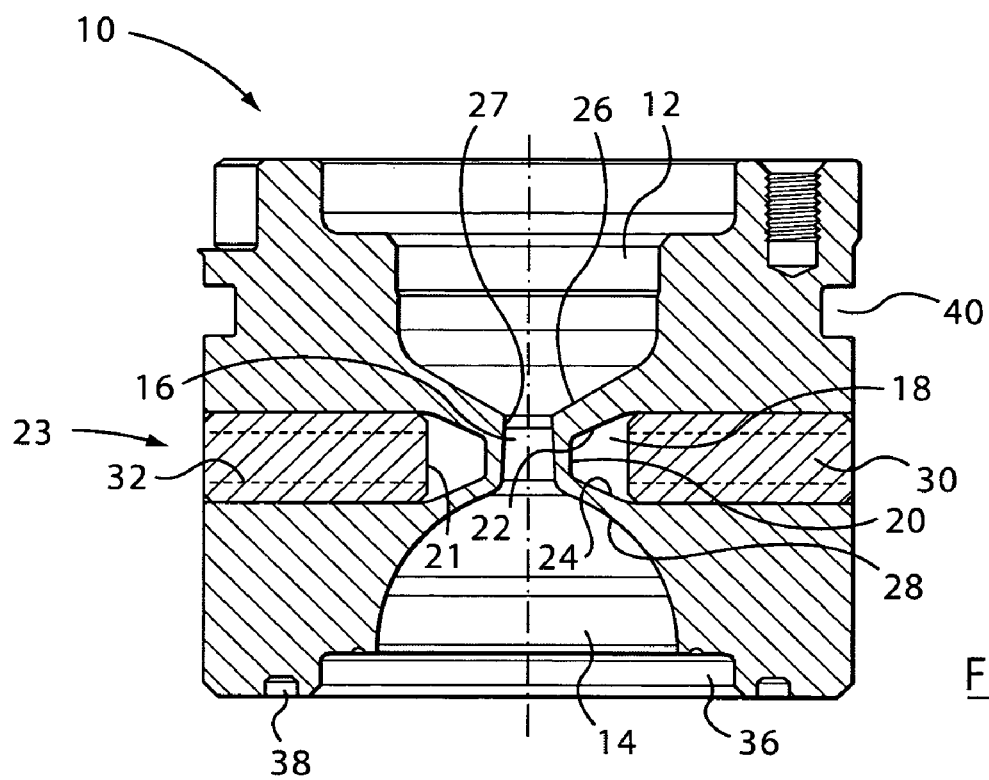
FIG. 1 illustrates a first embodiment of the gate insert structure, viewed in cross-section.
Figure 2:
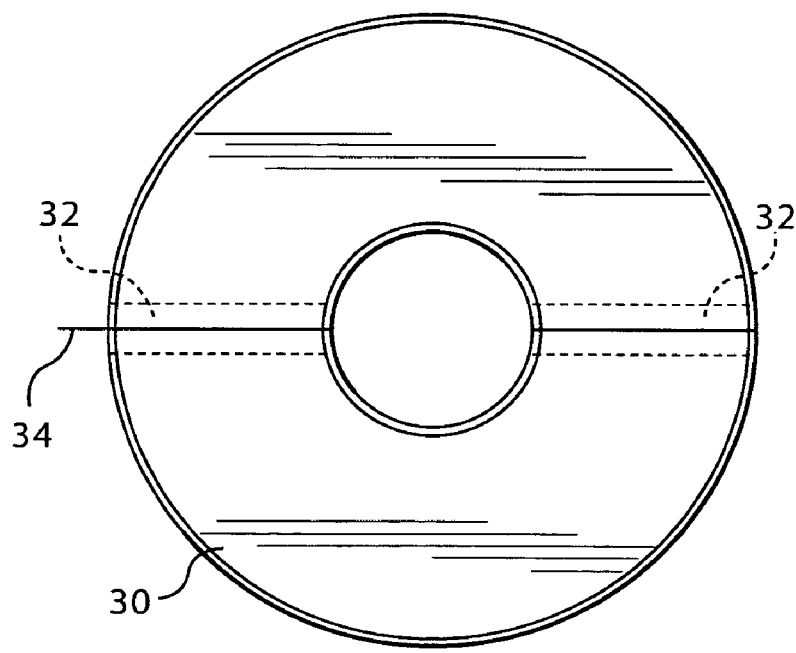
FIG. 2 is a top plan view of the structural insert to be used with the gate insert of FIG. 1.
Figure 3:
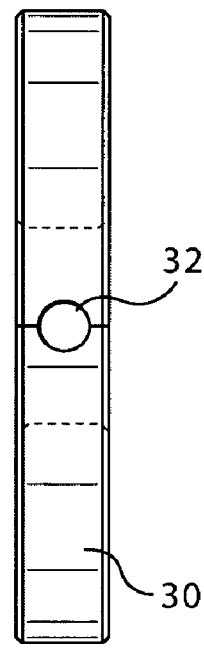
FIG. 3 is an end elevation of the structural insert to be used with the gate insert of FIG. 1.

Turning to the first embodiment of gate insert shown in FIGS. 1, 2 and 3, there is shown a gate insert 10 for a stack assembly. The gate insert 10 is a unitary item, although as described below, it could be manufactured from two or more parts, without departing from the scope of invention. The gate insert 10 has an aperture through it comprised of three portions: a nozzle interface 12, an upper part of a mold cavity 14, and a gate 16 which interconnects the nozzle interface and mold cavity. The gate 16 could be elongated to constitute an extended gate.

A coolant channel 18 is provided proximate the gate 16 between the nozzle interface 12, the mold cavity 14 and a structural insert 30. In particular, the coolant channel 18 surrounds the gate 16, in close proximity to it. It will be seen from FIG. 1 that the coolant channel 18 is shaped to follow substantially the profile of the gate 16. Preferably the coolant channel 18 is also shaped to follow the profile of the surfaces of the nozzle interface 12 and mold cavity 14 adjacent the gate. Therefore, it will be seen from FIG. 1 that the coolant channel 18 is defined in part by three surfaces 20, 22 and 24.

Surface 20 is substantially parallel to the surface 27 of the gate 16; surface 22 is substantially parallel to the surface 26 which partially defines the nozzle interface 12; and surface 24 is substantially parallel to the upper surface 28 of the mold cavity 14.

Preferably the distance between the coolant channel surfaces 20, 22 and 24 and the respective gate insert surfaces 27, 26, and 28 is substantially uniform. In the preferred embodiment, the optimum distance between those surfaces is approximately 2 millimetres so as to avoid mechanical failure from injection pressures and axial clamping forces.

It is envisaged that the coolant channel 18 can be profiled to any design distance according to the required cooling rates for the gate, thereby to minimise the crystallinity while at the same time balancing the likelihood of surface blemishes or geometric inaccuracies occurring by reducing the cycle time.

In the first embodiment illustrated in FIG. 1, the coolant channel 18 is manufactured by machining or otherwise forming a recess 23 including surfaces 20, 22, and 24 externally of the gate 16. In order to support the gate insert 10, a structural insert 30 is inserted in the recess. It is the structural insert 30 that provides further definition of the coolant channel 18 by defining an outer wall 21 of the coolant channel 18. The structural insert is therefore of an annular configuration.

In the preferred embodiment, the structural insert 30 is in the form of a split ring, shown in FIGS. 2 and 3 in which inflow and outflow coolant passageways 32 are provided, thereby communicating cooling fluid through the exterior surface 21 of the coolant channel 18. FIG. 2 illustrates the split line 34 of the split ring. The split ring 30 is manufactured of similar material to the gate insert, for example stainless steel, and fits closely within the recess 23 to provide support to the gate insert 10 when vertical forces are exerted through the molding stack components. Preferably, the coolant passageways 32 are sized so as to match the inflow and outflow coolant channels in a cavity plate that receives gate insert 10, thereby to optimise the channel volume and maintain the coolant medium velocity. Preferably, the inflow and outflow passageways 32 match the standard locations of the coolant channels in the cavity plate (not shown). The passageways 32 are directed along the split line 34 of the split ring 30 for the sake of ease of manufacture, alternatively they could be formed through the split ring 30.

In one class of embodiments, the gate insert is provided with a spigot 36 for engaging with a mold cavity and suitable O-ring grooves 38, 40 are provided, shown in FIG. 1, for receiving O-rings so as to provide "wet/dry" surfaces.

Figure 4:
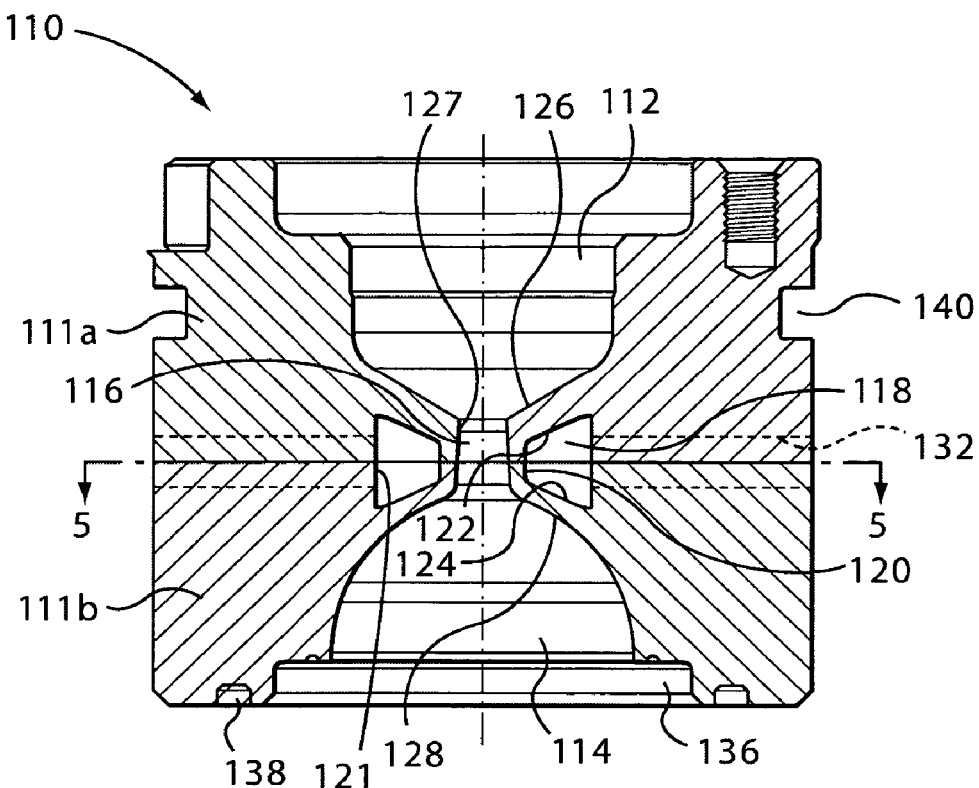
FIG. 4 illustrates a second embodiment of the gate insert structure, viewed in cross-section.
Figure 5:
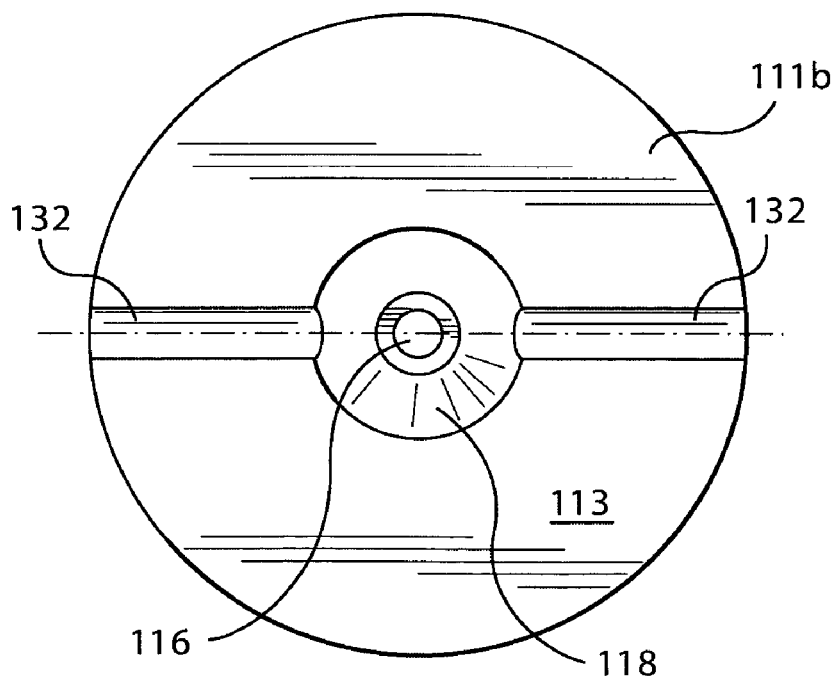
FIG. 5 is a cross-section view taken along line 5—5 of FIG. 4 and illustrates a top plan view of the molding half of the gate insert.

A second embodiment is illustrated in FIGS. 4 and 5. The second embodiment is similar to the first embodiment, with like parts being identified with like reference numerals, but with the prefix '1'.

In this embodiment, the gate insert 110 is manufactured from bonded halves, namely a nozzle half 111a and a molding half, 111b. The desired cooling channel 118 and coolant passageways 132 are milled, or otherwise formed, as a recess from the interfacing surfaces 113, shown in FIG. 5. Thereafter the nozzle half 111a and the molding half 111b are bonded by suitable known means, for example vacuum brazing, described in more detail in U.S. Pat. No. 5,855,983 the content of which is incorporated herein by reference. In contrast with the 3-part structure of FIGS. 1 to 3, FIGS. 4 and 5 benefit from a reduced port count and fewer thermal/physical interfaces arising from a 2-part design.

Again, the gate insert 110 has an aperture through it comprised of three portions: a nozzle interface 112, an upper part of mold cavity 114, and a gate 116 which interconnects the nozzle interface and mold cavity.

A coolant channel 118 is provided proximate the gate 116 between the nozzle interface 112 and the mold cavity 114. Like the first embodiment, the coolant channel 118 surrounds the gate 116, in close proximity to it. It will be seen from FIG. 4 that the coolant channel 118 is shaped to follow the profile of the gate. Preferably the coolant channel 118 is also shaped to follow the profile of the surfaces of the nozzle interface 112 and mold cavity 114 adjacent the gate. Therefore, it will be seen from FIG. 4 that the coolant channel 118 is defined by four surfaces 120, 122 and 124. Surface 120 is substantially parallel to the surface 127 of the gate 116. Surface 122 is substantially parallel to the surface 126 which partially defines the nozzle interface 112. Surface 124 is substantially parallel to the upper surface 128 of the mold cavity 114 and surface 121 defines a radially outwardly (or exterior) spaced surface from surface 120. As with the previous embodiment, preferably the distance between the coolant channel surfaces 120, 122, and 124 and the respective gate insert surfaces 127, 126, and 128 is also substantially uniform.

As mentioned above, the coolant channel 118 is, for example, milled as a recess from the interconnecting surfaces of each half of the gate insert 110. Therefore no structural insert is required in this embodiment. The inflow and outflow coolant passageways 132 are also milled as a recess from the same surfaces, thereby providing for fluid communication through the exterior surface 121 of the coolant channel 18. Preferably, the coolant passageways 132 are sized so as to match the inflow and outflow coolant channels in a cavity plate that receives gate insert 10, thereby to optimise the channel volume and maintain the coolant medium velocity. Again the inflow and outflow passageways 32 can be positioned to match the standard locations of the coolant channels in the cavity plate.

Like the first embodiment, the insert gate 110 is provided with a spigot 136 for engaging with the mold cavity and suitable O-ring grooves 138, 140 are provided in the insert gate for receiving O-rings so as to provide "wet/dry" surfaces.

Thus there is provided a gate insert 10, 110 for a stack assembly in a mold having a gate 16, 116 through which a melt of plastic material enters a mold cavity 14, 114 the gate insert having a cooling channel 18, 118 surrounding the gate 16, 116, which cooling channel is shaped to follow the profile of at least part of said gate 16, 116 and spaced by a substantially uniform distance from the surface of the gate.

Beneficially, this concept provides a capability of profiled cooling channels to any desired distance from the cooling medium to the preform molding surface, extended gate nub if it exists, and nozzle tip/insulator interface surfaces. Furthermore with the gate 16, 116 now being defined by a structural configuration that intrinsically returns, i.e., maximises, the use of a commonly used metal or alloy, improved structural stability in the gate insert is achieved.

Furthermore, the coolant medium is in close thermal contact with the gate thereby to maximise heat transfer. Also, the heat transfer is adjustable by profiling the location adjacent the gate nub, preform body and/or gate nozzle area by adjusting the location of the coolant channels.

The present invention and its preferred embodiments can be incorporated into the existing designs to be supplied to new molding stack or supplied on a retrofit basis, thus allowing the cooling improvement to be applied to existing molds.

It is envisaged that the various changes may be made within the scope of the present invention, for example, the size and shape of the coolant channels may be adjusted to the shape of the gate, mold cavity and/or nozzle interface. For example, the structural configuration of the gate and coolant passageway of the present invention can find application in technologies working with different materials than plastic, eg thixotropic system working with metal alloys.

Obviously, the gate cooling structure of the present invention is applicable to alternative configurations of the gate insert 10 that may not include a spigot 36.

What is claimed is:

1. A gate insert for a stack assembly of a mold, the gate insert having a gate for connecting a source of molding material with a mold cavity, the gate insert having a cooling channel surrounding the gate and a coolant passageway for connecting the cooling channel to a coolant supply, the cooling channel is shaped to follow a profile of at least part of said gate and spaced by a substantially uniform distance from a surface of the gate, the gate insert comprising:
   a nozzle portion;
   a molding portion;
   each of the portions having an interconnecting surface along which the nozzle and molding portions are bonded together; and
   the cooling channel and the coolant passageway are configured between the interconnecting surfaces of the nozzle and molding portions.

2. The gate insert of claim 1, wherein the cooling channel is further shaped to follow a profile of an upper part of the mold cavity adjacent the gate.

3. The gate insert of claim 1, wherein the cooling channel is further shaped to follow a profile of a nozzle interface adjacent the gate.

4. The gate insert of claim 1, wherein the coolant passageway comprises an inflow passageway and an outflow passageway, each passageway being connected to the cooling channel.

5. The gate insert of claim 1, wherein the gate is configured to form an extended nub on a molded preform.

6. A stack assembly in an injection mold, the stack assembly including a gate for connecting a source of molding material with a mold cavity, the gate insert having a cooling channel surrounding the gate and a coolant passageway for connecting the cooling channel to a coolant supply, the cooling channel is shaped to follow a profile of at least part of said gate and spaced by a substantially uniform distance from a surface of the gate, the gate insert comprising:
   a nozzle portion;
   a molding portion;
   each of the portions having an interconnecting surface along which the nozzle and molding portions are bonded together; and
   the cooling channel and the coolant passageway are configured between the interconnecting surfaces of the nozzle and molding portions.

7. The stack assembly of claim 6, wherein the cooling channel is further shaped to follow a profile of an upper part of the mold cavity adjacent the gate.

8. The stack assembly of claim 6, wherein the cooling channel is further shaped to follow a profile of a nozzle interface adjacent the gate.

9. The stack assembly of claim 6, wherein the coolant passageway comprises an inflow passageway and an outflow passageway, each passageway being connected to the cooling channel.

10. The stack assembly of claim 6, wherein the gate is configured to form an extended nub on a molded preform.

11. An injection mold including a gate for connecting a source of molding material with a mold cavity, the gate insert having a cooling channel surrounding the gate and a coolant passageway for connecting the cooling channel to a coolant supply, the cooling channel is shaped to follow a profile of at least part of said gate and spaced by a substantially uniform distance from a surface of the gate, the gate insert comprising:
   a nozzle portion;
   a molding portion;
   each of the portions having an interconnecting surface along which the nozzle and molding portions are bonded together; and
   the cooling channel and the coolant passageway are configured between the interconnecting surfaces of the nozzle and molding portions.

12. The injection mold of claim 11, wherein the cooling channel is further shaped to follow a profile of an upper part of the mold cavity adjacent the gate.

13. The injection mold of claim 11, wherein the cooling channel is further shaped to follow a profile of a nozzle interface adjacent the gate.

14. The injection mold of claim 11, wherein the coolant passageway comprises an inflow passageway and an outflow passageway, each passageway being connected to the cooling channel.

15. The injection mold of claim 11, wherein the gate is configured to form an extended nub on a molded preform.

* * * * *